US010437259B2

(12) United States Patent
Candido et al.

(10) Patent No.: US 10,437,259 B2
(45) Date of Patent: *Oct. 8, 2019

(54) SYSTEMS AND METHODS FOR CONTROLLING AERIAL VEHICLES

(71) Applicant: LOON LLC, Mountain View, CA (US)

(72) Inventors: Salvatore J. Candido, Mountain View, CA (US); Sameera Sylvia Ponda, Mountain View, CA (US)

(73) Assignee: Loon LLC, Mountain View, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/662,968

(22) Filed: Jul. 28, 2017

(65) Prior Publication Data

US 2019/0033884 A1 Jan. 31, 2019

(51) Int. Cl.
*G05D 1/04* (2006.01)
*B64B 1/40* (2006.01)
(Continued)

(52) U.S. Cl.
CPC ............... *G05D 1/042* (2013.01); *B64B 1/40* (2013.01); *B64C 39/024* (2013.01);
(Continued)

(58) Field of Classification Search
CPC ........ G05D 1/042; G05D 1/101; G05D 1/105; H04B 7/18504; B64C 2201/022;
(Continued)

(56) References Cited

U.S. PATENT DOCUMENTS 5,522,567 A * 6/1996 Kinstler ................. F41G 7/343
244/3.15
5,645,248 A * 7/1997 Campbell ................ B64B 1/00
244/125
(Continued)

FOREIGN PATENT DOCUMENTS

DE 4336056 A1 * 4/1995 ............... B64D 1/00
WO 2017/213706 A1 12/2017
WO 2017213706 A1 12/2017

OTHER PUBLICATIONS

Ramesh, Sai Sudha et al., "Reduced-Order Modeling of Stratospheric Winds and Its Application in High-Altitude Balloon Trajectory Simulations", Journal of Applied Meteorology and Climatology, vol. 56, Jun. 2017, pp. 1753-1766. (Year: 2017).*
(Continued)

*Primary Examiner* — Behrang Badii
*Assistant Examiner* — David A Testardi
(74) *Attorney, Agent, or Firm* — Botos Churchill IP Law

(57) ABSTRACT

Disclosed are systems, devices, and methods for controlling an aerial vehicle. An exemplary method may include receiving data indicating a location and an altitude of the aerial vehicle, receiving data indicating a destination of the aerial vehicle, determining a vector from the location of the aerial vehicle to the destination of the aerial vehicle, receiving prevailing wind pattern data regarding winds at the location and altitude of the aerial vehicle, planning a path for the aerial vehicle to move along the vector based on the prevailing wind pattern data, and causing the aerial vehicle to adjust the altitude of the aerial vehicle based on the prevailing wind pattern data and the planned path.

18 Claims, 7 Drawing Sheets

(51) Int. Cl.
*G08G 5/00* (2006.01)
*B64C 39/02* (2006.01)

(52) U.S. Cl.
CPC ......... *G08G 5/0013* (2013.01); *G08G 5/0026* (2013.01); *G08G 5/0034* (2013.01); *G08G 5/0039* (2013.01); *G08G 5/0052* (2013.01); *G08G 5/0069* (2013.01); *G08G 5/0091* (2013.01)

(58) Field of Classification Search
CPC .... B64C 39/024; G08G 5/003; G08G 5/0034; G08G 5/0039; G08G 5/0069; B64B 1/38; B64B 1/40
See application file for complete search history.

(56) References Cited

U.S. PATENT DOCUMENTS

| | | | |
|---|---|---|---|
| 6,167,263 A * | 12/2000 | Campbell | B64B 1/06 244/164 |
| 6,402,090 B1 * | 6/2002 | Aaron | B64B 1/00 244/24 |
| 6,628,941 B2 | 9/2003 | Knoblach et al. | |
| 7,203,491 B2 | 4/2007 | Knoblach et al. | |
| 7,356,390 B2 | 4/2008 | Knoblach et al. | |
| 7,469,857 B2 | 12/2008 | Voss | |
| 7,801,522 B2 | 9/2010 | Knoblach et al. | |
| 8,820,678 B2 | 9/2014 | DeVaul et al. | |
| 8,825,232 B2 | 9/2014 | Knoblach et al. | |
| 8,862,403 B1 * | 10/2014 | Piponi | G01C 21/20 701/533 |
| 8,967,533 B2 | 3/2015 | DeVaul et al. | |
| 9,139,279 B2 | 9/2015 | Heppe | |
| 9,296,461 B1 | 3/2016 | Roach | |
| 9,321,517 B1 * | 4/2016 | DeVaul | B64B 1/40 |
| 9,327,816 B1 * | 5/2016 | Mathe | G05D 1/042 |
| 9,329,600 B2 | 5/2016 | DeVaul et al. | |
| 9,340,272 B1 | 5/2016 | Devaul | |
| 9,409,646 B2 | 8/2016 | Fleck | |
| 9,418,243 B2 | 8/2016 | Bauer et al. | |
| 9,419,902 B1 | 8/2016 | Sites | |
| 9,420,023 B2 | 8/2016 | Ramamurthy et al. | |
| 9,519,045 B2 | 12/2016 | Knoblach et al. | |
| 9,540,091 B1 * | 1/2017 | MacCallum | B64B 1/44 |
| 9,632,503 B2 | 4/2017 | Knoblach et al. | |
| 9,665,103 B1 * | 5/2017 | Bonawitz | G05D 1/105 |
| 9,678,193 B2 * | 6/2017 | Knoblach | B64B 1/40 |
| 9,836,063 B1 | 12/2017 | Bonawitz et al. | |
| 2002/0007231 A1 * | 1/2002 | Lohmiller | G05D 1/0204 701/3 |
| 2002/0007232 A1 * | 1/2002 | Lohmiller | G05D 1/12 701/3 |
| 2003/0236070 A1 * | 12/2003 | Seligsohn | H04B 7/18502 455/12.1 |
| 2008/0299990 A1 * | 12/2008 | Knoblach | B64B 1/40 455/456.1 |
| 2009/0302165 A1 * | 12/2009 | Reinhard | B64D 17/025 244/152 |
| 2010/0004798 A1 | 1/2010 | Bodin et al. | |
| 2010/0181424 A1 | 7/2010 | Goossen et al. | |
| 2010/0230968 A1 | 9/2010 | Chernyshov | |
| 2012/0126052 A1 * | 5/2012 | Murakami | B64B 1/12 244/25 |
| 2012/0316725 A1 | 12/2012 | Trepagnier et al. | |
| 2013/0175391 A1 * | 7/2013 | DeVaul | G05D 1/104 244/96 |
| 2013/0221164 A1 * | 8/2013 | Klooster | G05D 1/0607 244/180 |
| 2013/0238784 A1 | 9/2013 | Teller | |
| 2014/0309821 A1 | 10/2014 | Poux et al. | |
| 2014/0333589 A1 | 11/2014 | Teller | |
| 2014/0367511 A1 * | 12/2014 | Knoblach | B64B 1/40 244/97 |
| 2016/0117853 A1 | 4/2016 | Zhong et al. | |
| 2017/0004714 A1 | 1/2017 | Rhee | |
| 2017/0162064 A1 * | 6/2017 | Ubhi | G01S 5/0027 |
| 2019/0033863 A1 * | 1/2019 | Candido | G05D 1/0088 |
| 2019/0033885 A1 * | 1/2019 | Candido | G05D 1/042 |
| 2019/0033886 A1 * | 1/2019 | Candido | G08G 5/0034 |

OTHER PUBLICATIONS

Invitation to Pay Additional Fees and, Where Applicable, Protest Fee for PCT Application No. PCT/US2018/043913, dated Oct. 1, 2018. 2 pages.
International Search Report and Written Opinion for Application No. PCT/US2018/043913 dated Dec. 11, 2018.

* cited by examiner

SYSTEMS AND METHODS FOR CONTROLLING AERIAL VEHICLES

BACKGROUND

Technical Field

The present disclosure relates to controlling flight of aerial vehicles, and, more particularly, to systems and methods for planning flight paths for the aerial vehicles and updating such flight paths when new data becomes available.

Description of Related Art

Unmanned aerial vehicles may travel at very high altitudes, including up to approximately 20 kilometers above the Earth's surface in the stratosphere, which is well above the altitudes of airplanes, wildlife, and weather events. In the stratosphere, winds are stratified, and each layer of wind may vary in speed and/or direction. The aerial vehicles may be moved using such winds, and a direction and/or speed of movement of the aerial vehicles may be controlled based on the winds in the various layers of the stratosphere. However, reliance on predicted weather data alone may be undesirable in planning and/or controlling flight paths of the aerial vehicles, because predicted weather data may be locally inaccurate and/or outdated. Improvements in systems and methods for course planning and controlling movement of aerial vehicles are described hereinbelow.

SUMMARY

Provided in accordance with embodiments of the present disclosure are systems for controlling an aerial vehicle. In an aspect of the present disclosure, an exemplary system includes an aerial vehicle and a computing device including a processor and a memory storing instructions which, when executed by the processor, cause the computing device to receive data indicating a location and an altitude of the aerial vehicle, receive data indicating a destination of the aerial vehicle, determine a vector from the location of the aerial vehicle to the destination of the aerial vehicle, receive prevailing wind pattern data regarding winds at the location and altitude of the aerial vehicle, plan a path for the aerial vehicle to move along the vector based on the prevailing wind pattern data, and cause the aerial vehicle to adjust the altitude of the aerial vehicle based on the prevailing wind pattern data and the planned path.

In another aspect of the present disclosure, the system further includes a position sensor, and the data indicating the location and the altitude of the aerial vehicle is received from the position sensor.

In a further aspect of the present disclosure, the position sensor is coupled to the aerial vehicle.

In another aspect of the present disclosure, the aerial vehicle is a balloon.

In yet another aspect of the present disclosure, the prevailing wind pattern data is received from an external source.

In still another aspect of the present disclosure, the prevailing wind pattern data is received from a sensor included in the aerial vehicle.

In yet another aspect of the present disclosure, the prevailing wind pattern data is a based on a combination of data received from an external source and from a sensor included in the aerial vehicle.

In still another aspect of the present disclosure, the instructions, when executed by the processor, further cause the computing device to determine that the aerial vehicle is not moving along the planned path, determine a new altitude for the aerial vehicle, and cause the aerial device to adjust the altitude of the aerial vehicle to the new altitude.

In a further aspect of the present disclosure, the instructions, when executed by the processor, further cause the computing device to receive additional prevailing wind pattern data regarding winds at the location and the new altitude of the aerial vehicle, and determine that the aerial vehicle is moving along the planned path.

In another aspect of the present disclosure, the new altitude is determined based on a distance between the altitude and the new altitude.

In yet another aspect of the present disclosure, the additional data is received from a sensor included in the aerial vehicle.

In still another aspect of the present disclosure, adjusting the altitude of the aerial vehicle to the new altitude includes increasing the altitude of the aerial vehicle.

In yet another aspect of the present disclosure, adjusting the altitude of the aerial vehicle to the new altitude includes decreasing the altitude of the aerial vehicle.

In still another aspect of the present disclosure, determining that the aerial vehicle is not moving along the planned path includes determining that the aerial vehicle is moving in a direction that is a predetermined amount different from a direction in the planned path.

In yet another aspect of the present disclosure, the instructions, when executed by the processor, further cause the computing device to determine a probability that a prevailing wind pattern at the new altitude will cause the aerial vehicle to move towards the destination, and determine that the probability exceeds a threshold.

In a further aspect of the present disclosure, the probability is based on a time since the additional prevailing wind pattern data was received.

In another aspect of the present disclosure, the probability is based on data received from an external source.

In yet another aspect of the present disclosure, the prevailing wind pattern is based on a speed and a direction of the wind.

Provided in accordance with embodiments of the present disclosure are methods for controlling an aerial vehicle. In an aspect of the present disclosure, an exemplary method includes receiving data indicating a location and an altitude of the aerial vehicle, receiving data indicating a destination of the aerial vehicle, determining a vector from the location of the aerial vehicle to the destination of the aerial vehicle, receiving prevailing wind pattern data regarding winds at the location and altitude of the aerial vehicle, planning a path for the aerial vehicle to move along the vector based on the prevailing wind pattern data, and causing the aerial vehicle to adjust the altitude of the aerial vehicle based on the prevailing wind pattern data and the planned path.

Provided in accordance with embodiments of the present disclosure are non-transitory computer-readable storage media storing a program for controlling an aerial vehicle. In an aspect of the present disclosure, an exemplary program includes instructions which, when executed by a processor, cause a computing device to receive data indicating a location and an altitude of the aerial vehicle, receive data indicating a destination of the aerial vehicle, determine a vector from the location of the aerial vehicle to the destination of the aerial vehicle, receive prevailing wind pattern data regarding winds at the location and altitude of the aerial vehicle, plan a path for the aerial vehicle to move along the vector based on the prevailing wind pattern data, and cause the aerial vehicle to adjust the altitude of the aerial vehicle based on the prevailing wind pattern data and the planned path.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein.

DETAILED DESCRIPTION

The present disclosure relates to systems and methods for controlling flight paths of aerial vehicles. More particularly, the present disclosure relates to planning a flight path or course of an aerial vehicle based on prevailing wind patterns, and seeking an optimal altitude for the aerial vehicle to move along a desired heading and/or at a desired speed, based on uncertainty in the prevailing wind patterns. The optimal altitude may be determined based on weather data received from external sources, and/or based on observations made by sensors and/or devices included in and/or coupled to the aerial vehicle. Wind vectors may be determined for various headings and altitudes, and the aerial vehicle may be allowed to move in a desired heading for a predetermined amount of time and/or until new prevailing wind pattern data is received. After a predetermined amount of time, or if it is determined that the aerial vehicle is not moving along the desired heading or otherwise not satisfying an objective, an altitude of the aerial vehicle may be adjusted to analyze prevailing wind patterns at different altitudes in order to determine if prevailing wind patterns at a different altitude will move the aerial vehicle along the desired vector. An optimal altitude for the aerial vehicle to move along the desired heading may then again be selected, and the flight path or course of the aerial vehicle may be updated based on the prevailing wind pattern at the selected altitude.

Figure 1:
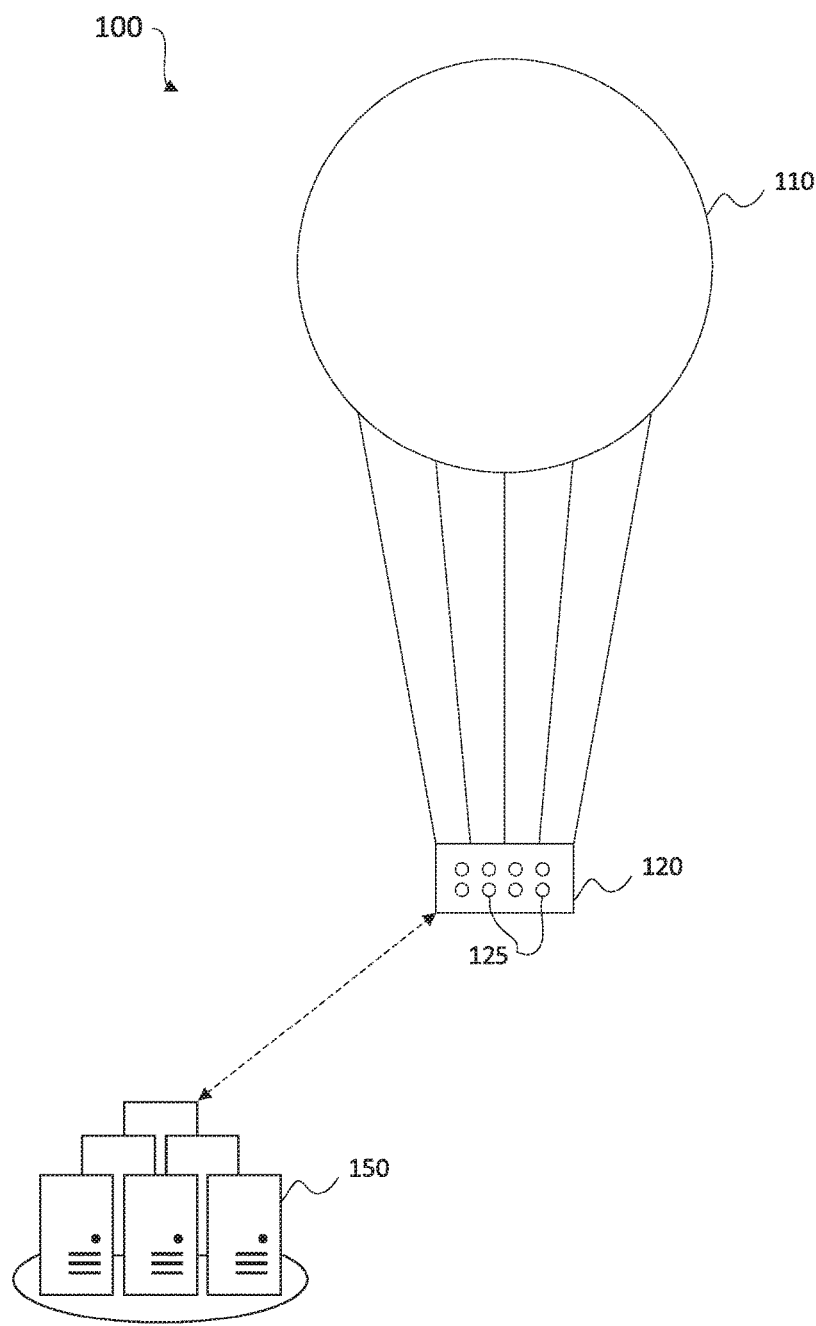
FIG. 1 is a schematic diagram of an exemplary system that may be used for controlling flight paths of aerial vehicles, according to an embodiment of the present disclosure.

With reference to FIG. 1, there is shown a schematic diagram of a system 100 for controlling an aerial vehicle, according to an embodiment of the present disclosure. System 100 may include an aerial vehicle 110, a controller for the aerial vehicle 120, various sensors 125, and a computing device 150. Aerial vehicle 110 may be any wind-influenced aerial vehicle such as, for example, a balloon carrying a payload. However, those skilled in the art will recognize that the systems and methods disclosed herein may similarly apply and be usable by various other types of aerial vehicles. Thus, aerial vehicle 110 may be any wind-influenced aerial vehicle.

Controller 120 may be a computing device and/or other logic circuit configured to control aerial vehicle 110. In an embodiment, controller 120 may be coupled to aerial vehicle 110. Controller 120 may include or be coupled to the various sensors 125. Sensors 125 may include one or more position sensors such as, for example, Global Positioning System (GPS) sensors, motion sensors such as accelerometers and gyroscopes, altitude sensors such as altimeters, wind speed and/or direction sensors such as wind vanes and anemometers, temperature sensors such as thermometers, resistance temperature detectors, and speed of sound temperature sensors, pressure sensors such as barometers and differential pressure sensors, etc. These examples of sensors are not intended to be limiting, and those skilled in the art will appreciate that sensors 125 may also include other sensors or combinations of sensors in addition to the examples described above without departing from the scope of the present disclosure. In some embodiments, sensors 125 are coupled to one or more cables extending out from controller 120, for example, cables hanging below controller 120 such as to obtain data at an altitude different from aerial vehicle 110. Controller 120 may further include or be coupled to an imaging device, such as a downward-facing camera and/or a star tracker.

Computing device 150 may be a computing device configured to control the operations of controller 120 and aerial vehicle 110. Computing device 150 may be any computing device configurable for use in controlling and/or planning a flight path for aerial vehicle 110 known to those skilled in the art. For example, computing device 150 may be a desktop computer, laptop computer, tablet computer, smart phone, server and terminal configuration, and/or any other computing device known to those skilled in the art. In some embodiments, computing device 150 and controller 120 are a single, unified device coupled to aerial vehicle 110. In other embodiments, computing device 150 may be coupled to aerial vehicle 110 as a separate device from controller 120. In still further embodiments, computing device 150 may be located remote from aerial vehicle 110 and may communicate with and/or control the operations of controller 120 via a network. In one embodiment, computing device 150 is a data center located on the ground, such as at a control facility, and communicates with controller 120 via a network. As described further below, system 100, and particularly computing device 150, may be used for planning a flight path or course for aerial vehicle 110 based on data regarding prevailing wind patterns to move aerial vehicle 110 along a desired heading. Various configurations of system 100 are envisioned, and various steps and/or functions of the processes described below may be shared among the various devices of system 100, or may be assigned to specific devices, i.e. computing device 150 and/or controller 120.

Figure 2:
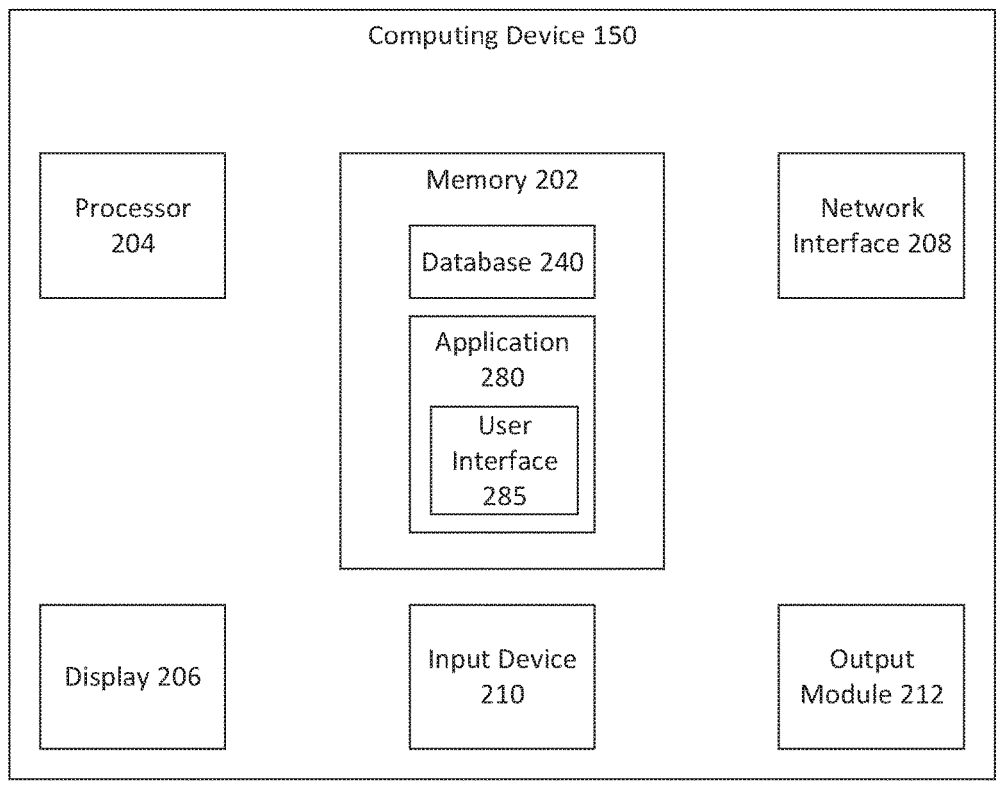
FIG. 2 is a simplified block diagram of an exemplary computing device forming part of the system of FIG. 1.

Turning now to FIG. 2, there is shown a simplified box diagram of computing device 150 forming part of system 100 of FIG. 1, according to an embodiment of the present disclosure. Computing device 150 includes a memory 202 storing a database 240 and an application 280. Application 280 may include instructions which, when executed by processor 204, cause computing device 150 to perform various steps and/or functions, as described below. Application 280 further includes instructions for generating a graphical user interface (GUI) 285. Database 240 may store various algorithms and/or data, including data regarding prevailing wind patterns, past and present locations of aerial vehicle 110, and/or wind observations detected at such locations, as further described below. Memory 202 may include any non-transitory computer-readable storage medium for storing data and/or software that is executable by processor 204, and/or any other medium which may be used to store information and which may be accessed by processor 204 to control the operation of computing device 150.

Computing device 150 may further include a display 206, a network interface 208, an input device 210, and/or an output module 212. Display 206 may be any display device by means of which computing device 150 may output and/or display data, such as via GUI 285. Network interface 208 may be configured to connect to a network such as a local area network (LAN) including one or more of a wired network, a wireless network, a wide area network (WAN), a wireless mobile network, a BLUETOOTH network, a satellite network, and/or the internet. Input device 210 may be a mouse, keyboard, or other hand-held controller, touch screen, voice interface, and/or any other device or interface by means of which a user may interact with computing device 150. Output module 212 may be a bus, port, and/or other interface by means of which computing device 150 may connect to and/or output data to other devices and/or peripherals.

With reference to FIGS. 3A-3D, there is shown a flowchart of an exemplary method 300 for controlling an aerial vehicle, according to an embodiment of the present disclosure. While the various steps of method 300 are described below in an ordered sequence, those skilled in the art will recognize that some or all of the steps of method 300 may be performed in a different order or sequence, repeated, and/or omitted without departing from the scope of the present disclosure.

Figure 3A:
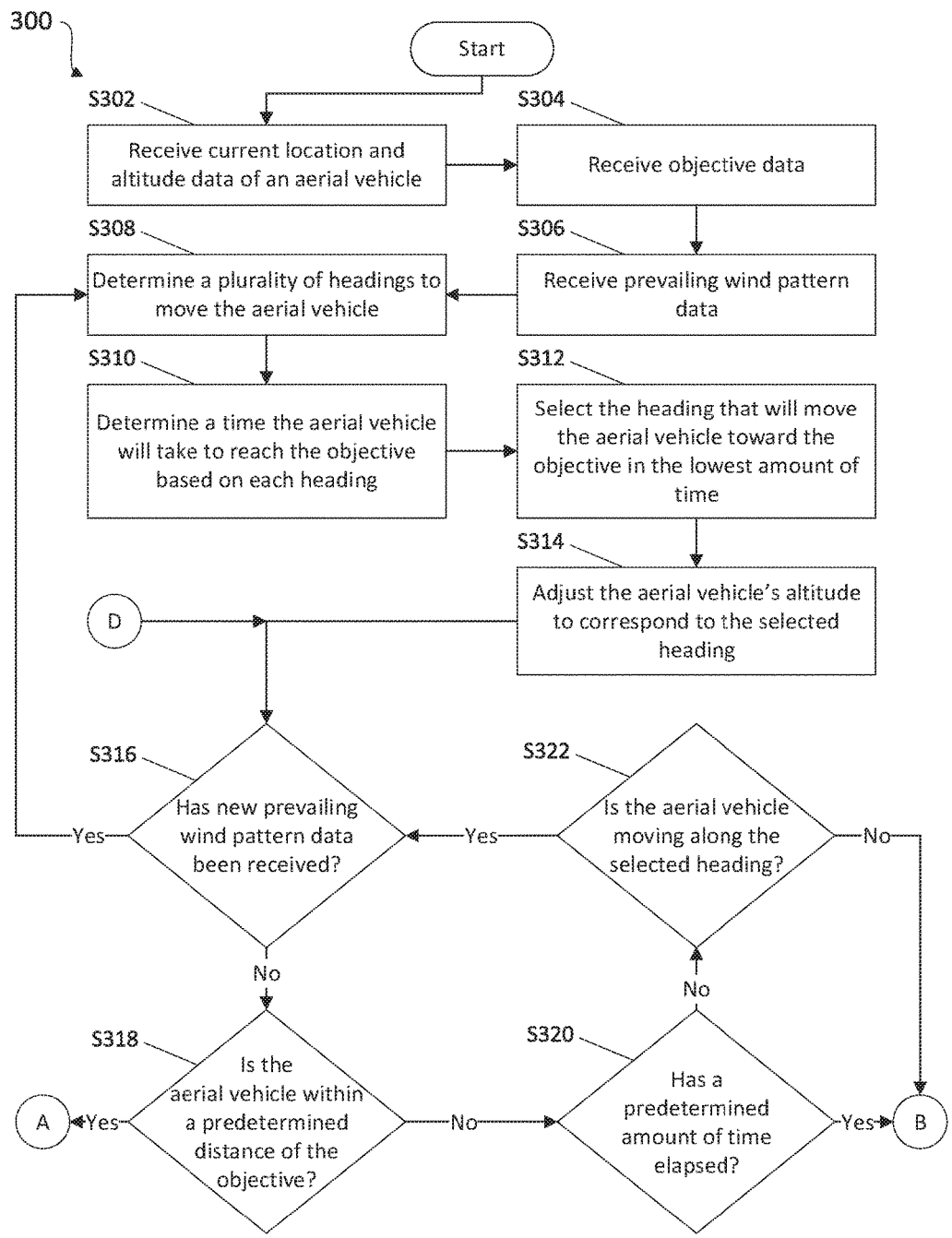
FIGS. 3A-3D show a flowchart of an exemplary method for controlling flight paths of aerial vehicles, according to an embodiment of the present disclosure.

Turning now to FIG. 3A, method 300 may start at step S302, where computing device 150 receives data regarding a current location and a current altitude of aerial vehicle 110. The data regarding the current location of aerial vehicle 110 may be received from one or more sensors 125, such as a GPS sensor. In some embodiments, the data regarding the current location of aerial vehicle may be triangulation data received from external sensors, such as sensors on the ground or another known position. The data regarding the current location of aerial vehicle 110 may also be determined or generated based on images, such as satellite images and/or other data sources external to aerial vehicle 110, or images captured by an imaging device coupled to aerial vehicle 110, such as a downward-facing camera and/or a star tracker. In other embodiments, the data regarding the current location of aerial vehicle 110 may be entered by a user, such as by using input device 210.

Similarly, the data regarding the current altitude of aerial vehicle 110 may be received from one or more sensors 125, such as an altimeter, a barometer, and/or a differential pressure sensor etc. In some embodiments, the data regarding the current altitude of aerial vehicle 110 may be determined based on a pressure inside a balloon. That is, the altitude of aerial vehicle 110 may be determined as a distance (e.g. a height) above sea level or another surface, and/or based on a pressure inside or outside of aerial vehicle 110. In other embodiments, the data regarding the current altitude of aerial vehicle 110 may be entered by a user, such as by using input device 210.

Thereafter, or concurrently therewith, at step S304, computing device 150 receives data regarding an objective of aerial vehicle 110. For example, the objective may be a predetermined destination inputted by a user, such as by using input device 210. In embodiments, the destination may be a geographic area and/or region (such as a city, state, or country, etc.) or a particular geographic point defined in latitude and longitude. In another example, the objective may an instruction be to fly to and/or via a particular area (e.g. fly across the Atlantic Ocean, fly over the Strait of Gibraltar, or fly around Cape Aghulas). In further examples, the objective may be to remain as close as possible to a particular geographic point for a maximum amount of time (e.g. determined based on resources onboard aerial vehicle 110), to minimize speed of aerial vehicle 110, or maximize the flight time of aerial vehicle 110 while avoiding a particular geographic region. In still further examples, the objective may be an instruction to generally move in a predetermined direction or heading. As will be appreciated by those skilled in the art, the objectives described here are merely for exemplary purposes and various other objectives may also be provided without departing from the scope of the present disclosure. In embodiments, computing device 150 may determine a vector from the current location of aerial vehicle 110, received at step S302, to the objective received at step S304.

Next, at step S306, computing device 150 receives data regarding prevailing wind patterns. The data regarding the prevailing wind patterns may include a prevailing wind vector (i.e. wind direction and wind speed) at one or more altitudes. For example, the data regarding prevailing wind patterns may include a prevailing wind vector at the current location and current altitude of aerial vehicle 110, and/or prevailing wind vectors at various other altitudes corresponding to the current location of aerial vehicle 110. In embodiments, the data regarding prevailing wind patterns may include global data, that is, the data regarding prevailing wind patterns may include prevailing wind vectors at various locations and/or altitudes around the globe. In some embodiments, the data regarding prevailing wind patterns may be detected by one or more sensors 125, such as wind vanes and/or anemometers, and transmitted to computing device 150. Additionally or alternatively, the data regarding prevailing wind patterns may be received from one or more external data sources, such as a weather observatory or weather service, examples of which include the National Oceanic and Atmospheric Administration (NOAA) and the European Centre for Medium-Range Weather Forecasts (ECMWF). The data regarding prevailing wind patterns may also be received from sensors included in other aerial vehicles, such as aerial vehicles located within a predetermined distance from aerial vehicle 110. In some embodiments, the data regarding prevailing wind patterns may be determined based on a combination of sources, such as external sources and/or sensors 125. Prevailing wind pattern data may be received continuously or at various intervals during operation of aerial vehicle 110, and as described further below, a heading and/or flight path of aerial vehicle 110 may be iteratively adjusted and/or updated based on new or additional prevailing wind pattern data.

Thereafter, at step S308, computing device 150 determines a plurality of headings along which aerial vehicle 110 may be moved from the current location of aerial vehicle 110, received at step S302. The plurality of headings may be determined based on the prevailing wind pattern data received at step S306, and may include a vector along which aerial vehicle will move at various altitudes. For example, computing device 150 may determine, based on prevailing wind vectors at various altitudes, a direction and distance that aerial vehicle 110 will move if aerial vehicle 110 maintains a particular altitude for a predetermined amount of time. Thus, differences in wind speed and/or direction at various altitudes may result in different possible headings from the same location.

Next, at step S310, computing device 150 determines a time aerial vehicle 110 will take to reach or complete the objective received at step S304 based on each heading. The determination may be based on the prevailing wind pattern data received at step S306 and the plurality of headings determined at step S308. For example, computing device 150 may generate and analyze a cartogram of travel times from the current location of aerial vehicle 110 received at step S302 to the objective (such as a destination) received at step S304. As used herein, the term "cartogram" refers to a map of points indicating predicted travel times from the current location of aerial vehicle 110 to the objective based on current prevailing wind patterns at various altitudes. For example, the travel times may be measured in days, hours, minutes, and/or any other relevant metric. Based on the analysis of the cartogram, computing device 150 may determine a predicted travel time for aerial vehicle 110 to reach the objective for each of the plurality of headings determined at step S308.

Computing device 150 then, at step S312, selects an optimal heading. For example, computing device 150 may select the heading that will move aerial vehicle 110 towards the objective in the lowest amount of time, as determined at step S310. In other examples, computing device 150 may weigh a speed of aerial vehicle 110, a direction of movement of aerial vehicle 110, and/or a distance to the objective received at step S304 when selecting the optimal heading. In some examples, prevailing wind patterns at the current location of aerial vehicle 110 may cause the heading with the shortest travel time to the objective to be a heading that is not the most direct route.

Figure 4:
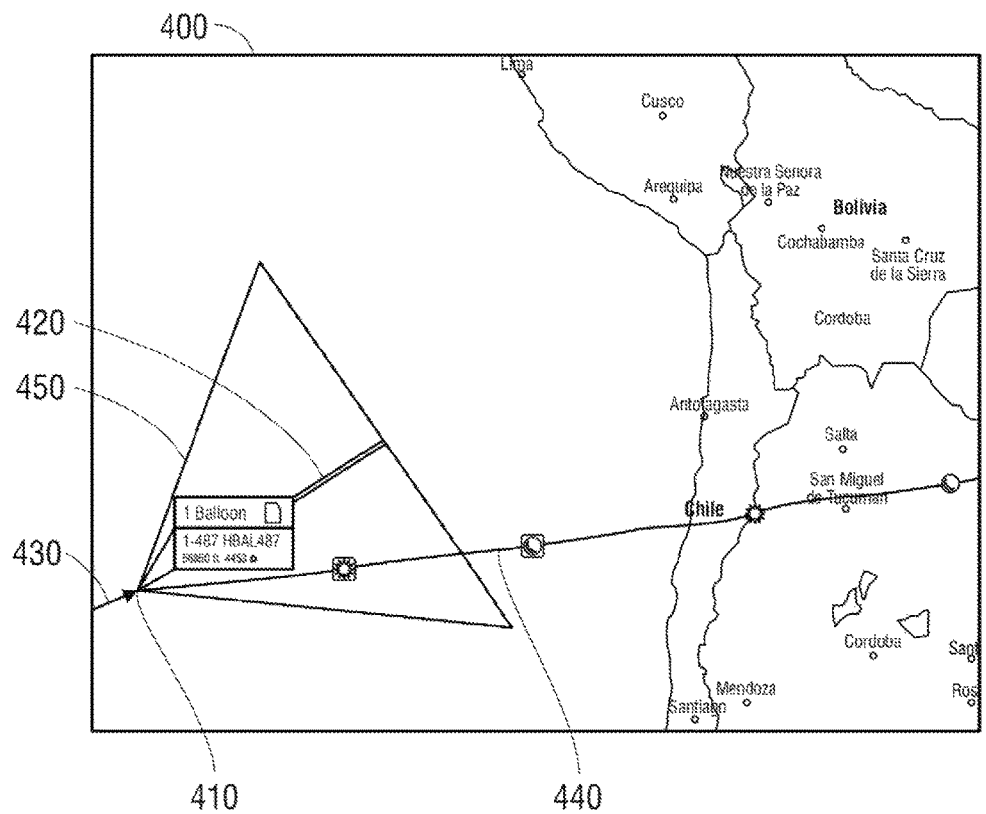
FIG. 4 shows an exemplary graphical user interface that may be displayed by the computing device of FIG. 2, according to an embodiment of the present disclosure.

Computing device 150 may further determine or plan a flight path from the current location of aerial vehicle 110 received at step S302 to the objective received at step S304 based on the prevailing wind pattern data received at step S306, the cartogram generated at step S310, and/or the heading selected at step S312. The flight path may be a projected route that aerial vehicle 110 will travel from the current location to the objective based on wind speeds and directions along the projected route. In embodiments, the flight path is determined based on a fastest route (as determined based on the prevailing wind patterns) from the current location to the objective. In other embodiments, the flight path is determined based on a most direct route and/or a vector from the current location to the objective. In still further embodiments, the flight path is determined based on one or more waypoints along a user-defined route. For example, the flight path may include one or more headings along which aerial vehicle 110 should move for various portions of the projected route, and/or one or more altitudes to which the altitude of aerial vehicle 110 should be adjusted at various points along the projected route. Computing device 150 may then cause a display device, such as display 206, to display a graphical user interface, such as GUI 285, showing the selected heading and/or the flight path, as shown in FIG. 4 (described below). A user may then review the selected heading and/or the flight path, and may provide input to computing device 150 adjusting and/or accepting the selected heading and/or the flight path.

Next, at step S314, computing device 150 may cause aerial vehicle 110 to adjust its altitude to an altitude corresponding with the heading selected at step S312. In embodiments, computing device 150 may send a signal or data packet to controller 120, the data packet including the altitude corresponding with the selected heading, whereafter controller 120 causes aerial vehicle 110 to adjust its altitude based on the flight path planned at step S312. In further embodiments, computing device 150 may send a signal or data packet to controller 120, the data packet including the altitude corresponding with a desired speed, whereafter controller 120 causes aerial vehicle 110 to adjust its altitude based on a speed at which aerial vehicle 110 is moving and/or a desired speed at which aerial vehicle 110 should move. For example, if the heading selected at step S312 corresponds to an altitude that is lower than the current altitude of aerial vehicle 110 (as received at step S302), computing device 150 causes aerial vehicle 110 to decrease its altitude. Likewise, if the heading selected at step S312 corresponds to an altitude that is higher than the current altitude of aerial vehicle 110 (as received at step S302), computing device 150 causes aerial vehicle 110 to increase its altitude. In instances where the current altitude of aerial vehicle 110 (as received at step S302) is the same as an altitude corresponding to the heading selected at step S312, computing device 150 does not cause aerial vehicle 110 to adjust its altitude at step S314.

Thereafter, at step S316, computing device 150 determines whether new prevailing wind pattern data has been received. Computing device 150 may further determine whether a new cartogram has been generated based on new prevailing wind pattern data. If computing device 150 determines that new prevailing wind pattern data has been received, processing returns to step S308, where computing device 150 again determines a plurality of headings in which aerial vehicle 110 can be moved based on the new wind pattern data. Alternatively, if computing device 150 determines that new prevailing wind pattern data has not been received, processing proceeds to step S318.

At step S318, computing device 150 determines whether aerial vehicle 110 is within a predetermined distance of the objective. Depending on the type of objective, different distances may define a boundary or threshold around the objective. For example, the boundary may be defined as a distance where a speed of aerial vehicle 110 is weighted evenly with a direction of movement of aerial vehicle 110 when selecting an optimal heading for aerial vehicle. That is, when aerial vehicle 110 is more than the predetermined distance from the objective received at step S302, computing device 150 weighs a direction of movement of aerial vehicle heavier than a speed of aerial vehicle 110 when selecting an optimal heading for aerial vehicle. Likewise, when aerial vehicle 110 is less than the predetermined distance from the objective received at step S302, computing device 150 weighs a speed of aerial vehicle 110 heavier than a direction of movement of aerial vehicle 110 when selecting an optimal heading for aerial vehicle 110. The predetermined distance may be based on input received from a user and/or prevailing wind pattern data. For example, in some embodiments, the predetermined distance may be based on coordination, such as fleet management, of multiple aerial vehicles 110. If computing device 150 determines that aerial vehicle 110 is within the predetermined distance of the objective, processing skips ahead to step S330. Alternatively, if computing device 150 determines that aerial vehicle 110 is not within the predetermined distance of the objective, processing proceeds to step S320.

At step S320, computing device determines whether a predetermined amount of time has elapsed. The predetermined amount of time may be measured from a time since the heading of aerial vehicle 110 was selected, a time since new prevailing wind pattern data was last received, a time since a new cartogram was last generated, and/or an amount of time since the altitude of aerial vehicle 110 was last adjusted. For example, the predetermined amount of time may be an amount of time for which prevailing wind pattern data is expected to be accurate, and/or an amount of time based on which the plurality of headings was determined at step S308. If computing device 150 determines that the predetermined amount of time has elapsed, processing skips ahead to step S350. Alternatively, if computing device 150 determines that the predetermined amount of time has not elapsed, processing proceeds to step S322.

At step S322, computing device 150 determines whether aerial vehicle 110 is moving along the heading selected at step S312. Alternatively, or in addition, computing device 150 may determine whether aerial vehicle 110 is moving along the flight path determined at step S312. For example, computing device 150 may receive and process additional data regarding an updated location of aerial vehicle 110. Computing device 150 may then determine, based on the updated location of aerial vehicle 110, whether aerial vehicle 110 is moving along the heading selected at step S312, the flight path determined at step S312, and/or otherwise satisfying the objective received at step S304. In embodiments, determining whether aerial vehicle 110 is moving along the heading selected at step S312 and/or the flight path determined at step S312 may include determining whether the direction in which aerial vehicle 110 is moving is more than a predetermined amount different from the selected heading and/or the flight path. In further embodiments, determining whether aerial vehicle 110 is moving along the heading selected at step S312 and/or the flight path determined at step S312 may include determining whether the direction in which aerial vehicle 110 is moving is within a threshold or range of the heading selected at step S312 and/or the flight path determined at step S312. For example, computing device 150 may determine whether the direction in which aerial vehicle 110 is moving is within a predetermined number of degrees different from the heading selected at step S312 and/or the flight path determined at step S312. In still further embodiments, determining whether aerial vehicle 110 is satisfying the objective received at step S304 may include determining a distance between the updated location of aerial vehicle 110 and a particular point, geographical location, and/or any other relevant metric that may be used for assessing whether movement of aerial vehicle 110 is satisfying the objective. If it is determined that aerial vehicle 110 is not moving along the selected heading or the flight path and/or not otherwise satisfying the objective, processing skips ahead to step S350. Alternatively, if it is determined that aerial vehicle 110 is moving along the selected heading or the flight path, processing returns to step S316, where computing device 150 again determines whether new prevailing wind pattern data has been received.

Figure 3B:
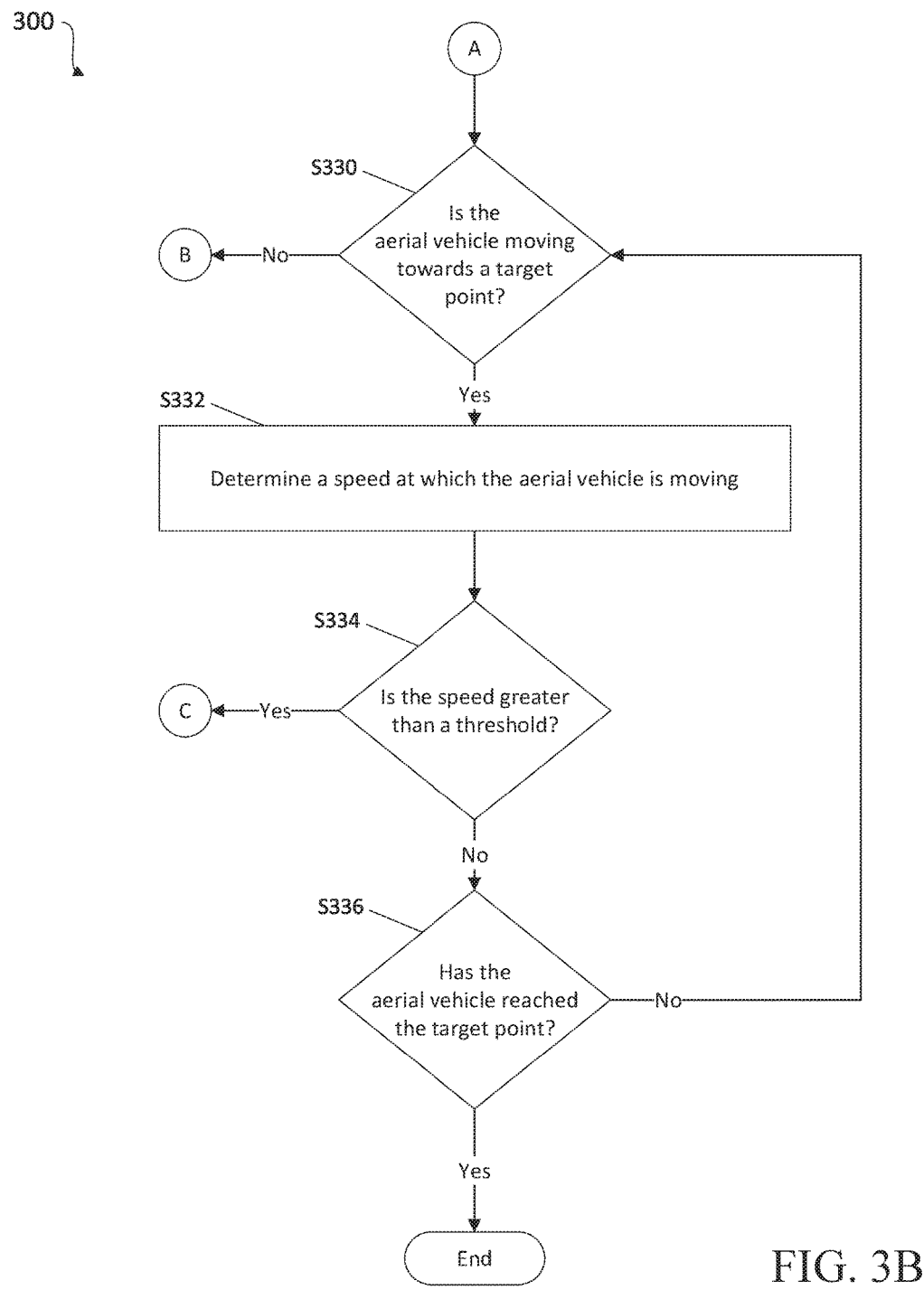

Turning now to FIG. 3B, at step S330, computing device 150 determines whether aerial vehicle 110 is moving towards a target point. Alternatively, or in addition, computing device 150 may determine whether aerial vehicle 110 is moving along the flight path determined at step S312. For example, the target point may be a particular point defined in latitude and longitude within the boundary around the objective. In embodiments, the target point is a center point around which the boundary is defined. Computing device 150 may determine whether aerial vehicle 110 is moving towards the target point based on a direction in which aerial vehicle is moving. For example, computing device 150 may determine whether the direction in which aerial vehicle is currently moving intersects with the target point. If computing device 150 determines that aerial vehicle is not moving towards the target point, processing skips ahead to step S350. Alternatively, if computing device 150 determines that aerial vehicle 110 is moving towards the target point, processing proceeds to step S332.

At step S332, computing device 150 determines a speed at which aerial vehicle 110 is moving. The speed may be determined based on one or more sensors 125, such as accelerometers and/or based on prevailing wind pattern data. Thereafter, at step S334, computing device 150 determines whether the speed at which aerial vehicle 110 is moving is greater than a threshold. For example, the threshold may be calculated based on and/or correlated to a distance between aerial vehicle 110 and the target point. That is, as the distance between aerial vehicle 110 and the target point becomes smaller, the threshold is lowered. If computing device 150 determines that the speed at which aerial vehicle 110 is moving is greater than the threshold, processing skips ahead to step S370. Alternatively, if computing device 150 determines that the speed at which aerial vehicle 110 is moving is not greater than the threshold, processing proceeds to step S336.

At step S336, computing device 150 determines whether aerial vehicle 110 has reached the target point. For example, computing device 150 may determine, based on data regarding an updated location of aerial vehicle 110 received from one or more sensors 125, that aerial vehicle 110 has reached the target point. If computing device 150 determines that aerial vehicle 110 has not reached the target point, processing returns to step S330. Alternatively, computing device 150 determines that aerial vehicle 110 has reached the target point, processing ends.

Figure 3C:
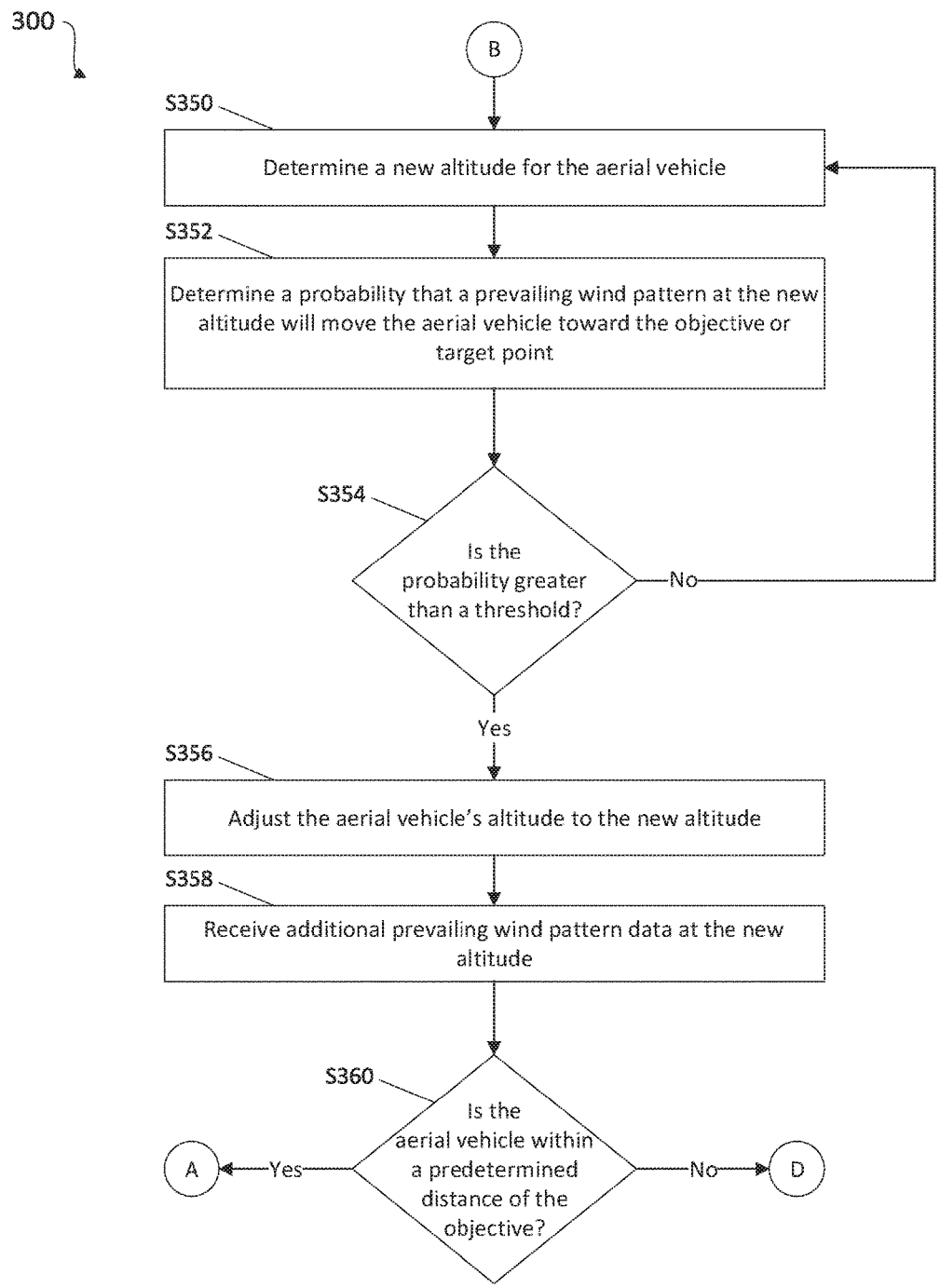

Turning now to FIG. 3C, at step S350, computing device 150 determines a new altitude for aerial vehicle 110. For example, computing device 150 may receive and process additional data regarding prevailing wind patterns at other altitudes at the current location of aerial vehicle 110 to determine a new altitude for aerial vehicle 110. Additionally or alternatively, the determination may be based on one or more models of wind vectors at various altitudes. The determination may further be based on a distance between the current altitude of aerial vehicle 110 and the new altitude. For example, altitudes that are closer to the current altitude of aerial vehicle 110 may be favored over altitudes that are a greater distance from the current altitude of aerial vehicle 110. In embodiments, determining a new altitude for aerial vehicle 110 may take into account energy usage required to adjust the altitude of aerial vehicle 110. For example, adjusting the altitude of aerial vehicle 110 to a higher altitude uses more energy than adjusting to a lower altitude, and thus potentially favorable lower altitudes may be preferred over higher altitudes. Additionally, large adjustments in altitude may be disfavored over smaller adjustments where possible, such as to conserve energy and/or limit mechanical wear and tear.

Thereafter, at step S352, computing device 150 determines a probability that a prevailing wind pattern at the new altitude will move aerial vehicle 110 toward the objective received at step S304, and/or toward the target point. In embodiments, computing device 150 may determine the probability based on whether the prevailing wind pattern at the new altitude will move aerial vehicle 110 in a direction that is less than the predetermined amount different from the flight path determined at step S312. For example, computing device 150 may further process the additional prevailing wind pattern data received at step S350 to determine the probability. For example, computing device 150 may compare data received from sensors 125 to data received from external sources to determine local accuracy of the data received from external sources, and thereby determine the probability that the prevailing wind pattern at the new altitude will move aerial vehicle 110 toward the objective. Additionally or alternatively, the determination may be based on one or more models of wind vectors at various altitudes. The probability may further be based on a time since the data regarding the prevailing wind pattern at the new altitude was last received. For example, a greater time since the data regarding the prevailing wind pattern at the new altitude was last received may indicate a greater chance that the prevailing wind pattern may have changed, and thus may result in a higher probability. Alternatively, a shorter time since the data regarding the prevailing wind pattern at the new altitude was last received may indicate a lower chance that the prevailing wind pattern has changed, and may result in a lower probability. The probability may also be based on a distance between the new altitude and the current altitude of aerial vehicle 110 and/or an altitude for which prevailing wind pattern data is available.

Thereafter, at step S354, computing device 150 determines whether the probability is greater than a threshold. If computing device 150 determines that the probability is not greater than the threshold, processing returns to step S350 where another new altitude is determined. Alternatively, if computing device 150 determines that the probability is greater than the threshold, processing proceeds to step S356.

At step S356, the altitude of aerial vehicle 110 is adjusted to the new altitude determined at step S350. For example, computing device 150 may cause controller 120 to change the altitude of aerial vehicle 110 to the new altitude. If the new altitude is higher than the current altitude of aerial vehicle 110, the altitude of aerial vehicle 110 may be increased. Alternatively, if the new altitude is lower than the current altitude of aerial vehicle 110, the altitude of aerial vehicle 110 may be decreased.

Thereafter, at step S358, computing device 150 receives additional prevailing wind pattern data at the new altitude of aerial vehicle 110. For example, the additional prevailing wind pattern data may be collected by and/or received from one or more sensors 125. Then, at step S360, computing device 150 determines whether aerial vehicle 110 is within the predetermined distance or boundary of the objective, as determined at step S318 (described above). If computing device 150 determines that aerial vehicle 110 is within the predetermined distance of the objective, processing returns to step S330. Alternatively, if computing device 150 determines that aerial vehicle 110 is not within the predetermined distance of the objective, processing returns to step S316.

Figure 3D:
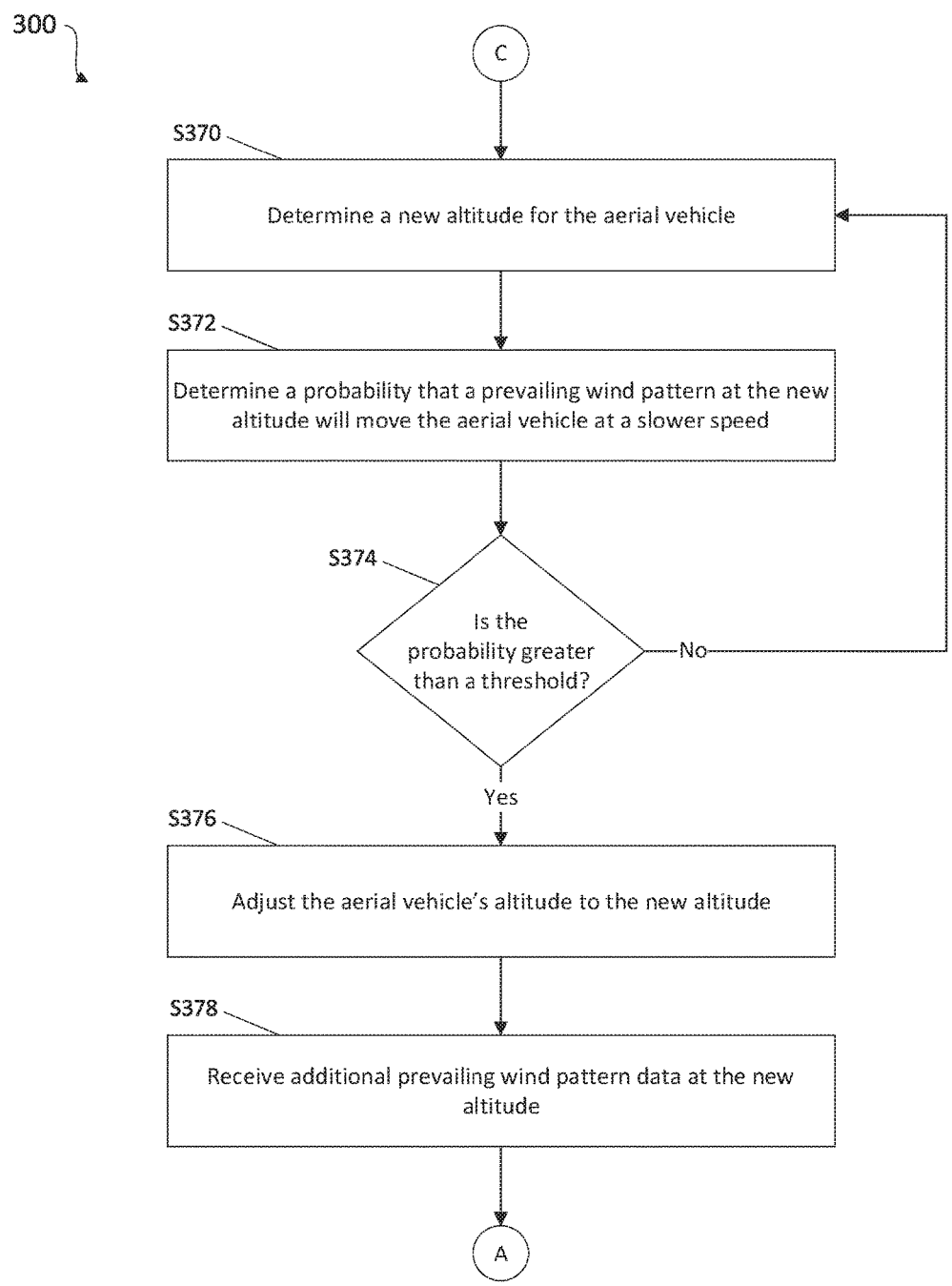

Turning now to FIG. 3D, at step S370, computing device 150 determines a new altitude for aerial vehicle 110. For example, computing device 150 may receive and process additional data regarding prevailing wind patterns at other altitudes at the current location of aerial vehicle 110 to determine a new altitude for aerial vehicle 110. Additionally or alternatively, the determination may be based on one or more models of wind vectors at various altitudes. The determination may further be based on a distance between the current altitude of aerial vehicle 110 and the new altitude. For example, altitudes that are closer to the current altitude of aerial vehicle 110 may be favored over altitudes that are a greater distance from the current altitude of aerial vehicle 110.

Thereafter, at step S372, computing device 150 determines a probability that a prevailing wind pattern at the new altitude will move aerial vehicle 110 at a slower speed. For example, computing device 150 may further process the additional prevailing wind pattern data received at step S350 to determine the probability. Additionally or alternatively, the determination may be based on one or more models of wind vectors at various altitudes. The probability may further be based on a time since the data regarding the prevailing wind pattern at the new altitude was last received. For example, a greater time since the data regarding the prevailing wind pattern at the new altitude was last received may indicate a greater chance that the prevailing wind pattern may have changed, and thus may result in a higher probability. Alternatively, a shorter time since the data regarding the prevailing wind pattern at the new altitude was last received may indicate a lower chance that the prevailing wind pattern has changed, and may result in a lower probability.

Thereafter, at step S374, computing device 150 determines whether the probability is greater than a threshold. If computing device 150 determines that the probability is not greater than the threshold, processing returns to step S370 where another new altitude is determined. Alternatively, if computing device 150 determines that the probability is greater than the threshold, processing proceeds to step S376.

At step S376, the altitude of aerial vehicle 110 is adjusted to the new altitude determined at step S370. For example, computing device 150 may cause controller 120 to change the altitude of aerial vehicle 110 to the new altitude. If the new altitude is higher than the current altitude of aerial vehicle 110, the altitude of aerial vehicle 110 may be increased. Alternatively, if the new altitude is lower than the current altitude of aerial vehicle 110, the altitude of aerial vehicle 110 may be decreased.

Thereafter, at step S378, computing device 150 receives additional prevailing wind pattern data at the new altitude of aerial vehicle 110. For example, the additional prevailing wind pattern data may be collected by and/or received from one or more sensors 125. Processing then returns to step S330.

With reference to FIG. 4, there is shown an exemplary graphical user interface (GUI) 400 that may be displayed by computing device 150, such as via display 206, according to an embodiment of the present disclosure. GUI 400 may include a map showing an indication of a current location 410 of aerial vehicle 110. GUI 400 may further show an indication of the heading 420 of aerial vehicle 110, corresponding to the heading selected at step S312. An indication of a path previously travelled 430 by aerial vehicle 110 and an indication of the planned flight path 440 may also be shown. Additionally, a cone 450 indicating an acceptable range of movement may also be shown. Cone 450 may be centered on heading 420, and may show a range of directions in which aerial vehicle may move based on the heading selected at step S312. As described above, a user may review the heading 420 and/or planned flight path 440, and may adjust the heading 420 and/or flight path 440, for example, by adjusting a width and/or direction of cone 450.

Detailed embodiments of devices, systems incorporating such devices, and methods using the same as described herein. However, these detailed embodiments are merely examples of the disclosure, which may be embodied in various forms. Therefore, specific structural and functional details disclosed herein are not to be interpreted as limiting, but merely as a basis for the claims and as a representative basis for allowing one skilled in the art to variously employ the present disclosure in appropriately detailed structure.

What is claimed is:

1. A system for controlling an aerial vehicle, the system comprising:
an aerial vehicle; and
a computing device including:
a processor; and
a memory storing instructions which, when executed by the processor, cause the computing device to:
receive data indicating a location and an altitude of the aerial vehicle;
receive data indicating a destination of the aerial vehicle;
determine a vector from the location of the aerial vehicle to the destination of the aerial vehicle;
receive prevailing wind pattern data regarding winds at the location and altitude of the aerial vehicle;
plan a path for the aerial vehicle to move along the vector based on the prevailing wind pattern data;
cause the aerial vehicle to adjust the altitude of the aerial vehicle based on the planned path;
determine that the aerial vehicle is not moving along the planned path, wherein the determination that the aerial vehicle is not moving along the planned path includes a determination that the aerial vehicle is moving in a direction that is a predetermined amount different from a direction in the planned path;
in response to the determination that the aerial vehicle is not moving along the planned path, determine a new altitude for the aerial vehicle; and
cause the aerial vehicle to adjust the altitude of the aerial vehicle to the new altitude.

2. The system according to claim 1, further comprising:
a position sensor,
wherein the data indicating the location and the altitude of the aerial vehicle is received from the position sensor.

3. The system according to claim 2, wherein the position sensor is coupled to the aerial vehicle.

4. The system according to claim 1, wherein the aerial vehicle is a balloon.

5. The system according to claim 1, wherein the prevailing wind pattern data is received from an external source.

6. The system according to claim 1, wherein the prevailing wind pattern data is received from a sensor included in the aerial vehicle.

7. The system according to claim 1, wherein the prevailing wind pattern data is a based on a combination of data received from an external source and from a sensor included in the aerial vehicle.

8. The system according to claim 1, wherein the instructions, when executed by the processor, further cause the computing device to:
receive additional prevailing wind pattern data regarding winds at the location and the new altitude of the aerial vehicle.

9. The system according to claim 8, wherein the additional prevailing wind pattern data is received from a sensor included in the aerial vehicle.

10. The system according to claim 1, wherein the new altitude is determined based on a distance between the altitude and the new altitude.

11. The system according to claim 1, wherein adjusting the altitude of the aerial vehicle to the new altitude includes increasing the altitude of the aerial vehicle.

12. The system according to claim 1, wherein adjusting the altitude of the aerial vehicle to the new altitude includes decreasing the altitude of the aerial vehicle.

13. The system according to claim 1, wherein the instructions, when executed by the processor, further cause the computing device to:
determine a probability that a prevailing wind pattern at the new altitude will cause the aerial vehicle to move towards the destination; and
determine that the probability exceeds a threshold.

14. The system according to claim 13, wherein the probability is based on a time since the additional prevailing wind pattern data was received.

15. The system according to claim 13, wherein the probability is based on data received from an external source.

16. The system according to claim 1, wherein the prevailing wind pattern is based on a speed and a direction of the wind.

17. A method for controlling an aerial vehicle, the method comprising:
receiving data indicating a location and an altitude of the aerial vehicle;
receiving data indicating a destination of the aerial vehicle;
determining a vector from the location of the aerial vehicle to the destination of the aerial vehicle;
receiving prevailing wind pattern data regarding winds at the location and altitude of the aerial vehicle;
planning a path for the aerial vehicle to move along the vector based on the prevailing wind pattern data;
causing the aerial vehicle to adjust the altitude of the aerial vehicle based on the planned path;
determining that the aerial vehicle is not moving along the planned path, wherein determining that the aerial vehicle is not moving along the planned path includes determining that the aerial vehicle is moving in a direction that is a predetermined amount different from a direction in the planned path;
in response to the determining that the aerial vehicle is not moving along the planned path, determining a new altitude for the aerial vehicle; and
causing the aerial vehicle to adjust the altitude of the aerial vehicle to the new altitude.

18. A non-transitory computer-readable storage medium storing a program for controlling an aerial vehicle, the program including instructions which, when executed by a processor, cause a computing device to:
receive data indicating a location and an altitude of the aerial vehicle;
receive data indicating a destination of the aerial vehicle;
determine a vector from the location of the aerial vehicle to the destination of the aerial vehicle;
receive prevailing wind pattern data regarding winds at the location and altitude of the aerial vehicle;
plan a path for the aerial vehicle to move along the vector based on the prevailing wind pattern data;
cause the aerial vehicle to adjust the altitude of the aerial vehicle based on the planned path;
determine that the aerial vehicle is not moving along the planned path, wherein the determination that the aerial vehicle is not moving along the planned path includes a determination that the aerial vehicle is moving in a direction that is a predetermined amount different from a direction in the planned path;

in response to the determination that the aerial vehicle is not moving along the planned path, determine a new altitude for the aerial vehicle; and cause the aerial vehicle to adjust the altitude of the aerial vehicle to the new altitude.

\* \* \* \* \*